United States Patent [19]

Katsuki et al.

[11] Patent Number: 4,933,748
[45] Date of Patent: Jun. 12, 1990

[54] APPARATUS FOR PROCESSING A COLOR VIDEO SIGNAL

[75] Inventors: Shinji Katsuki, Tokyo; Masaki Kawano, Kanagawa, both of Japan

[73] Assignee: Sony Corporation, Tokyo, Japan

[21] Appl. No.: 314,153

[22] Filed: Feb. 23, 1989

[30] Foreign Application Priority Data

Mar. 2, 1988 [JP] Japan .................................. 63-49287

[51] Int. Cl.$^5$ ............................................ H04N 11/20
[52] U.S. Cl. ........................................ 358/11; 358/12; 358/16
[58] Field of Search ...................... 358/12, 16, 11, 152, 358/313

[56] References Cited

U.S. PATENT DOCUMENTS 4,605,951  8/1986  Kuribayashi ........................... 358/11

Primary Examiner—Tommy P. Chin
Assistant Examiner—James Juo
Attorney, Agent, or Firm—Alvin Sinderbrand

[57] ABSTRACT

In an apparatus for processing a repeatedly reproduced single field of a color video signal, the phase of a chrominance subcarrier in the color video signal is shifted by 90 degrees at each field period, and the single repeatedly reproduced field of the color video signal is selectively delayed during alternate field periods for a delay time equal to one-half the horizontal scanning period so that the single field, as repeatedly reproduced and selectively delayed in two successive field periods, can function as interlaced fields of a frame while avoiding disturbance of the chrominance subcarrier due to the selective delaying in alternate field periods.

3 Claims, 3 Drawing Sheets

APPARATUS FOR PROCESSING A COLOR VIDEO SIGNAL

BACKGROUND OF THE INVENTION

1. Field of the Invention

This invention relates generally to an apparatus for processing a color video signal, and more particularly is directed to an apparatus for processing a repeatedly reproduced single field of a color video signal, such as is provided by a so-called electronic still camera, so that it is converted into interlaced fields of a frame signal capable of being displayed by a standard monitor television receiver.

DESCRIPTION OF THE PRIOR ART

In a so-called electronic still camera, a color video signal of one field period is recorded in one circular track on a magnetic recording disk and, upon playback, the single field of the color video signal recorded in such track is repeatedly reproduced. In order to make it possible to display the repeatedly reproduced single field of the color video signal as a still picture by means of a standard monitor television receiver, the single repeatedly reproduced field of the color video signal has to be selectively delayed during alternate field periods so that the single field, as repeatedly reproduced and selectively delayed in two successive field periods, can function as interlaced fields of a frame signal which can be displayed as a still picture by the standard monitor television receiver.

As shown in FIG. 1, in an apparatus according to the prior art for processing a single field of a color video signal so as to permit the same to be displayed as a still picture by a standard monitor television receiver, the single field of a color video signal is recorded in a circular track on a magnetic recording disk 1 and is adapted to be repeatedly reproduced by a magnetic reproducing head 2. The repeatedly reproduced color video signal is supplied through a playback amplifier 3 to a separating circuit 4 in which a luminance signal Y and a chrominance signal C are separated from the reproduced color video signal. The separated luminance signal Y is demodulated, for example, in a FM-demodulator 5, and the resulting demodulated luminance signal is supplied to a mixing circuit 6.

The chrominance signal C from the separating circuit 4 is demodulated, for example, by an FM-demodulator 7, and the resulting demodulated chrominance signal is supplied to a chroma processing circuit 8 in which two color difference signals, for example, the signals R-Y and B-Y, recorded in accordance with the line sequential color television system are made to exist simultaneously. The color difference signals R-Y and B-Y are supplied to so-called quadrature two-phase modulators 9a and 9b, respectively, for modulating a chrominance subcarrier signal therein. The chrominance subcarrier signal is supplied by an oscillator 10 directly to the modulator 9a and is supplied to the modulator 9b through a phase shifter 11 which phase-shifts the signal by 90 degrees. In accordance with the NTSC standard, the phase of the chrominance subcarrier generated by the oscillator 10 is inverted at every horizontal scanning period. The two color difference signals R-Y and B-Y modulating the chrominance subcarrier signals which are relatively phase-shifted by 90 degrees in the phase shifter 11 are supplied from the modulators 9a and 9b, respectively, to the mixing circuit 6 so that the latter provides, at its output, a so-called NTSC field signal.

The NTSC field signal from the mixing circuit 6 is supplied directly to a contact a of a switching circuit 12, and is further supplied through a delay circuit 13 having a delay time of H/2, in which H is one horizontal scanning period, to another contact b of the switching circuit 12. A movable contact c of the switching circuit 12 is alternately made to engage the fixed contacts a and b, as indicated in full and broken lines on FIG. 1, by means of a switching signal FS which is applied to a terminal 14 and which is inverted or changed in polarity at each field period. Thus, in alternating field periods, the switching circuit 12 delivers to an output terminal 15 the NTSC field signal as received directly from the mixing circuit 6, and such NTSC field signal delayed by one-half a horizontal scanning period. Therefore, the signal derived at the output terminal 15 in two successive field periods can function as interlaced fields of a frame signal to be displayed as a still picture by a standard monitor television receiver.

However, in the above-described apparatus according to the prior art, the phase of the chrominance subcarrier is disturbed in the so-called frame signal obtained at the output terminal 15. More specifically, as earlier noted, the phase of the chrominance subcarrier generated by the oscillator 10 is inverted at every horizontal scanning period in accordance with the NTSC standard. Thus, at the point where the switch circuit 12 changes over between the position shown in full lines and the position shown in broken lines on FIG. 1, that is, changes over from the field signal received directly from the mixing circuit 6 to the field signal delayed by one-half horizontal period in the delay circuit 13, there is a 90degree change or discontinuity in the phase of the chrominance subcarrier. Accordingly, if the frame signal in which the phase of its chrominance subcarrier is discontinuous is supplied to the color monitor television receiver, the color at the upper portion of the display picture will be disturbed. The quality of the color picture is particularly deteriorated in the case where the color monitor television receiver embodies a rather slow acting chrominance signal processing circuit.

In order to avoid the above described problems associated with the prior art apparatus of FIG. 1, it has been proposed to modify such apparatus for processing a color video signal as shown in FIG. 2 in which parts corresponding to those described already with reference to FIG. 1 are identified by the same reference numerals and will not be further described in detail herein. More particularly, it will be seen that, in the modified apparatus according to the prior art shown in FIG. 2, the luminance signal Y demodulated by the FM-demodulator 5 and the chrominance signal C demodulated by the FM-demodulator 7 are supplied directly to contacts a of switches 16A and 16B of a switching circuit 16. The demodulated luminance signal and the demodulated chrominance signal are further supplied through delay circuits 13A and 13B, respectively, to contacts b of the switches 16A and 16B. Such delay circuits 13A and 13B each have a delay time equal to one-half a horizontal scanning period. The switches 16A and 16B of the switching circuit 16 are operated together in response to the switching signal FS applied to the terminal 14 so that movable contacts c of the switches 16A and 16B will alternately engage their respective fixed contacts a and b in successive field periods of the color video signal. The demodulated luminance signal which is delayed in delay circuit 13A by one-half a horizontal scanning period in alternate field periods is supplied from the switch 16A directly to the mixing circuit 6, while the demodulated chrominance signal which is similarly delayed in delay circuit 13B by one-half horizontal scanning period in alternate field periods is supplied from the switch 16B to the chroma processing circuit 8 which provides therefrom the color difference signals R-Y and B-Y supplied to the quadrature two-phase modulators 9a and 9b, respectively. As before, the chrominance subcarrier is supplied from the oscillator 10 directly to the modulator 9a and through the 90 degree phase-shifter 11 to the modulator 9b, and the two color-difference signals modulating the chrominance sub-carriers are supplied from the modulators 9a and 9b to the mixing circuit 6 which thereby provides an NTSC frame signal at the output terminal 15.

Since the delay circuits 13A and 13B act independently on the demodulated luminance and chrominance signals, respectively, the one-half horizontal scanning period delay applied, in alternating field periods, to the demodulated chrominance signal has no affect on the chrominance subcarriers which are thereafter modulated with the color difference signals. Thus, the output derived at terminal 15 in two successive field periods can function as interlaced fields of a frame while avoiding the disturbance of the chrominance subcarrier that was a characteristic disadvantage of the prior art apparatus shown in FIG. 1. However, the arrangement of FIG. 2 requires two delay circuits 13A and 13B which are relatively expensive and require a substantial increase in the size of the circuit. Thus, the manufacturing cost of the apparatus for processing a color video signal, as shown in FIG. 2, is undesirably high.

OBJECTS AND SUMMARY OF THE INVENTION

Accordingly, it is an object of the present invention to provide an improved apparatus for processing a color video signal which avoids the above mentioned disadvantages of the prior art.

More specifically, it is an object of this invention to provide an apparatus for processing a repeatedly reproduced single field of a color video signal so that such single field, as repeatedly reproduced in two successive field periods, can function as interlaced fields of a frame while avoiding disturbance of the chrominance subcarrier thereof.

Still another object is to provide an apparatus for processing a color video signal, as aforesaid, and which is relatively compact and inexpensive.

In accordance with an aspect of this invention in an apparatus for processing a repeatedly reproduced single field of a color video signal, the phase of a chrominance subcarrier in the color video signal is shifted by 90 degrees at each field period, and the single repeatedly reproduced field of the color video signal is selectively delayed during alternate field periods for a delay time equal to one-half the horizontal scanning period so that the single field, as repeatedly reproduced and selectively delayed in two successive field periods, can function as interlaced fields of a frame while avoiding disturbance of the chrominance subcarrier due to the selective delaying in alternate field periods.

The above, and other objects, features and advantages of the present invention, will be apparent in the following detailed description of a preferred embodiment of the invention when read in conjunction with the accompanying drawings in which the same reference numerals identify corresponding parts in the several views.

DETAILED DESCRIPTION OF THE PREFERRED EMBODIMENT

Figure 1:
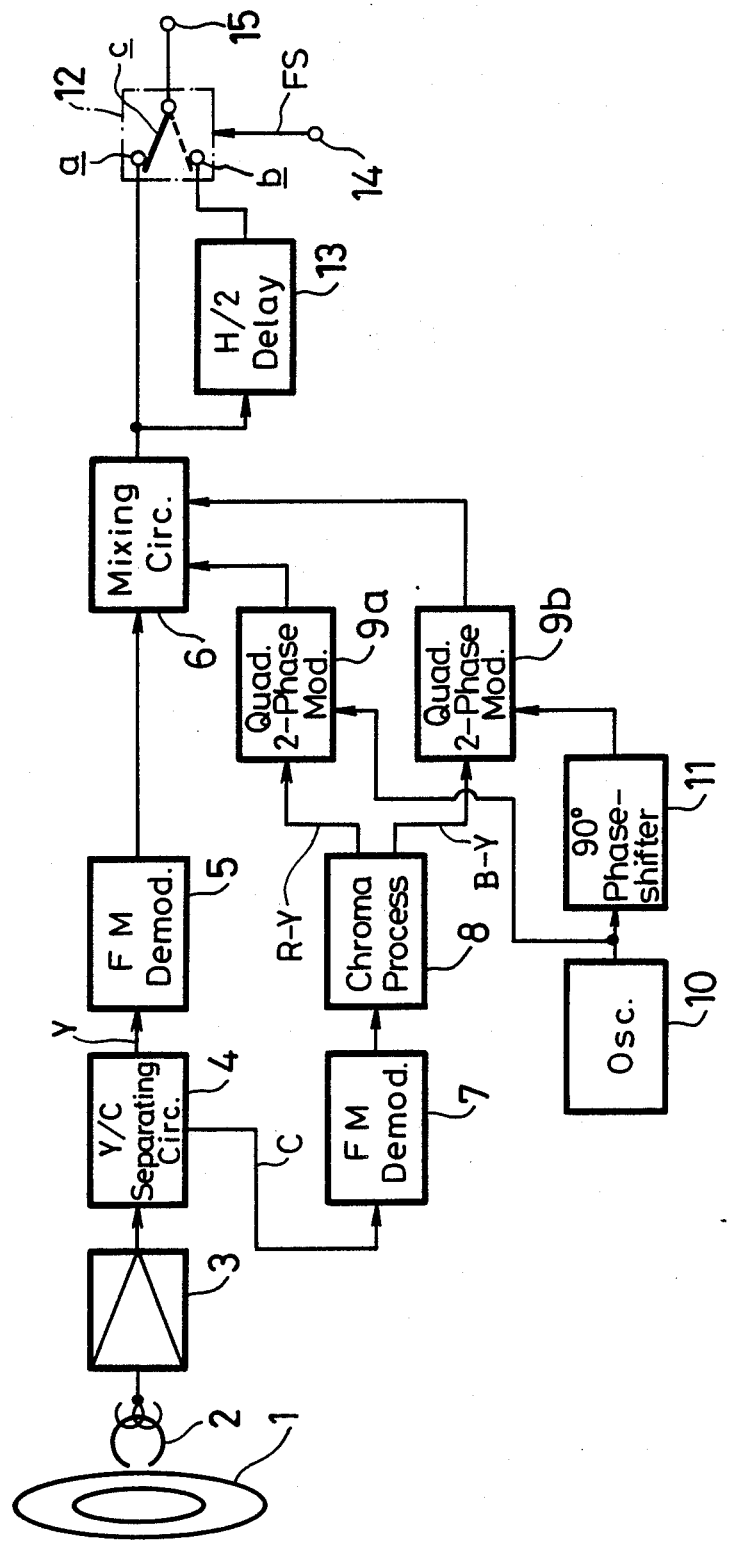
FIG. 1 is a block diagram showing an apparatus according to the prior art for processing a repeatedly reproduced single field of a color video signal in accordance with the prior art.
Figure 2:
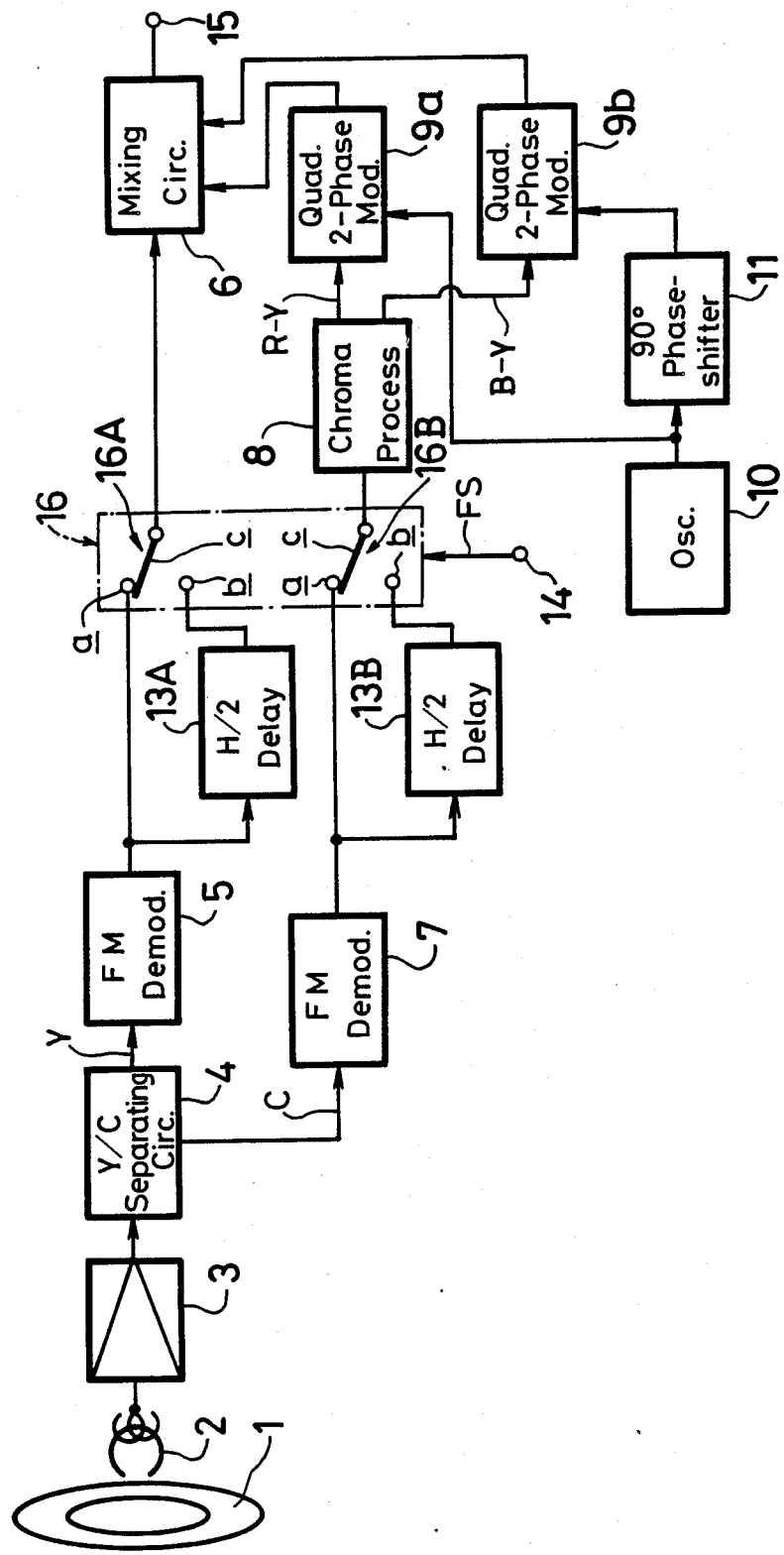
FIG. 2 is a block diagram showing another apparatus for processing a repeatedly reproduced single field of a color video signal according to the prior art.
Figure 3:
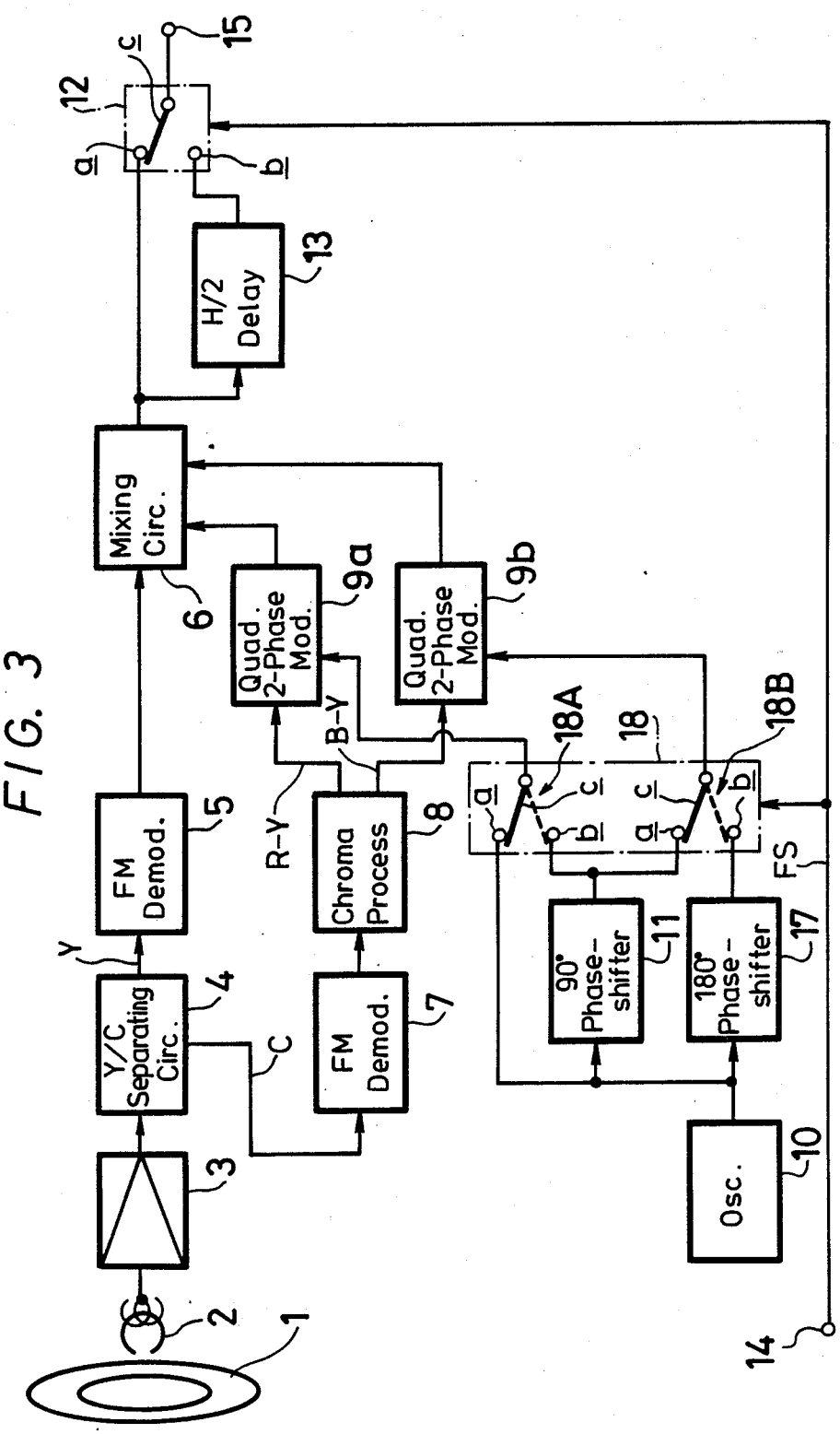
FIG. 3 is a block diagram showing an apparatus for processing a repeatedly reproduced single field of a color video signal in accordance with an embodiment of the present invention.

Referring now to FIG. 3, it will be seen that an apparatus for processing a color video signal according to an embodiment of the present invention, as there illustrated, is, in some respects, similar to the prior art apparatus of FIG. 1, in that it comprises a recording disk 1 having a color video signal of one field recorded in a circular track on the disk. Such color video signal of one field is repeatedly reproduced from the disk 1 by a reproducing head 2 and supplied from the latter through a playback amplifier 3 to a separating circuit 4 in which the luminance and chrominance signals Y and C are separated from the reproduced signal. The separated luminance signal Y is supplied to an FM-demodulator 5 and the resulting demodulated luminance signal is supplied to a mixing circuit 6.

The separated chrominance signal C is supplied from the separating circuit 4 to an FM-demodulator 7 and the resulting demodulated chrominance signal is fed to a chroma processing circuit 8 in which the two color difference signals R-Y and B-Y recorded in a line-sequential manner are made to exit substantially simultaneously. The resulting processed color difference signals R-Y and B-Y are supplied to the quadrature two-phase modulator 9a and 9b, respectively. The outputs of the modulators 9a and 9b are supplied to the mixing circuit 6, and the output of the latter is supplied directly to the contact a of the switching circuit 12 and through the delay circuit 13 to the contact b of the switching circuit 12 which further has its movable contact c connected to the output terminal 15. To the extent described above, the apparatus according to the present invention, as shown on FIG. 3, is the same as the apparatus according to the prior art described with reference to FIG. 1.

However, in accordance with the present invention, the chrominance subcarrier signal from the oscillator 10 is supplied both to the 90 degree phase-shifter 11 and to a 180 degree phase-shifter 17. Further, a switching circuit 18 is provided which includes a switch 18A having fixed contacts a and b connected to the output of the oscillator 10 and to the output of the 90 degree phase-shifter 11, while a movable contact c of the switch 18A is connected to the quadrature two-phase modulator 9a. A second switch 18B of the switching circuit 18 has fixed contact a and b connected to the output of the 90 degree phase-shifter 11 and the output of the 180 degree phase-shifter 17, respectively, while a movable contact c of the switch 18B is connected to the quadrature two-phase modulator 9b. The switches 18A and 18B of the switching circuit 18 are operated by the switching signal FS applied to the terminal 14 so that the ganged movable contacts c of the switches 18A and 18B are changed-over alternately between the first and second states or conditions shown in full lines and in broken lines, respectively, at each of the field periods of the color video signal.

As before, the chrominance subcarrier produced by the oscillator 10 has its phase inverted at every horizontal scanning period in accordance with the NTSC standard.

It will be appreciated that, when the movable contacts c of the switches 18A and 18B are in the state or positions shown in full lines on FIG. 3, during one of two successive field periods, the chrominance subcarrier, as generated by the oscillator 10, that is, without further phase shift, is applied through switch 18A to the modulator 9a to be modulated therein by the color difference signal R-Y and, at the same time, the switch 18B supplies the chrominance subcarrier further shifted in phase by 90 degrees from the phase-shifter 11 to the modulator 9b for modulation in the latter by the color difference signal B-Y. During the next of the two successive field periods, the movable contacts c of the switches 18A and 18B are changed-over to the positions or state shown in broken lines, that is, to engage the respective fixed contacts b. Thus, at such time, the chrominance sub-carriers then applied to the modulators 9a and 9b are shifted by 90 degrees and by 180 degrees, respectively, relative to the chrominance subcarrier generated by the oscillator 10. Therefore, during the second of the two successive field periods, the color difference signals R-Y and B-Y are quadrature-2-phase-modulated on chrominance sub-carriers that are spaced angularly by 90 degrees and by 180 degrees, respectively, relative to the output of the oscillator 10. As a result of the foregoing, the NTSC field signal provided at the output of the mixing circuit 6 has its chrominance subcarrier shifted by 90 degrees at each field. Such NTSC field signal from the mixing circuit 6, and the same signal as delayed by one-half horizontal scanning period in the delay circuit 13 are supplied, through switch circuit 12, in alternating field periods, to the output terminal 15 so as to provide a frame signal in which the phase of the chrominance subcarrier is continuous.

More specifically, even though the chrominance subcarrier provided by the oscillator 10 has its phase inverted at every horizontal scanning period in accordance with the NTSC standard, the further shifting of the phase of the chrominance subcarrier by 90 degrees at every field in accordance with the present invention, as by the phase shifters 11 and 17 and the switching circuit 18 in the embodiment illustrated on FIG. 3, ensures that, when the field signal issuing from the mixing circuit 6 is selectively delayed during alternating field periods for a delay time equal to one-half a horizontal scanning period, as by the delay circuit 13 and switching circuit 12, for forming interlaced fields of a frame, the phase of the chrominance subcarrier of the frame signal will be continuous at the time of the change-over of the switching circuit 12. Thus, it is possible, in accordance with the present invention, to obtain a reproduced picture of excellent quality without any disturbance of the color, particularly at the upper portion of the picture.

It is to be noted that, in the described arrangement embodying the present invention, only one H/2 delay circuit 13 is required to convert the field signal into a frame signal so that the apparatus embodying the present invention can be relatively simple and very inexpensive.

Although the illustrated embodiment of the invention converts the field signal into a frame signal by selectively delaying the single repeatedly reproduced field of the color video signal during alternating field periods thereof for a delay time equal to one-half a horizontal scanning period, the present invention can be similarly applied to other arrangements for converting a field signal into a frame signal. For example, the essential feature of the present invention, namely, the changing of the phase of the subcarrier for the chrominance component of the color video signal by 90 degrees at each of the field periods, can be applied to an apparatus in which the converting of a field signal into a frame signal is achieved by delaying a vertical synchronizing signal by a delay time of one-half a horizontal scanning period at each field period by means of a monostable multivibrator or the like.

Although a preferred embodiment of the invention has been described in detail herein with reference to the accompanying drawings it is to be understood that the invention is not limited to that precise embodiment, and that various changes and modifications may be effected therein by one skilled in the art without departing from the scope or spirit of the invention as defined in the appended claims.

What is claimed is:

1. An apparatus for processing a repeatedly reproduced single field of a color video signal which includes luminance and chrominance components, comprising:
   means for separating said luminance and chrominance components;
   means for demodulating the separated luminance and chrominance components;
   means for obtaining first and second color difference signals from the demodulated chrominance component;
   a source of a subcarrier signal;
   phase shifting means for changing a phase of said subcarrier signal from said chrominance component of the color video signal by 90 degrees at each of said field periods;
   first and second quadrature two-phase modulators in which said first and second color difference signals modulate said phase changed chrominance subcarrier signal;
   said phase shifting means including a first phase-shifter for providing a 90 degree phase shift to said subcarrier signal from said source, a second phase-shifter for providing a 180 degree phase shift to said subcarrier signal from said source, and switching means changed-over between first and second states at the commencement of each of said field periods, said switching means, in said first state, supplying said first and second quadrature two-phase modulators with said subcarrier signal directly from said source and from said first phase-shifter, respectively, and said switching means, in said second state, supplying said first and second quadrature two-phase modulators with said subcarrier signal from said first and second phase-shifter, respectively;

mixing means for receiving the demodulated luminance component and outputs of said first and second quadrature two-phase modulators and providing therefrom a processed field signal; and means receiving said processed field signal for selectively delaying said single repeatedly reproduced field of the color video signal during alternating field periods thereof for a delay time equal to one-half a horizontal scanning period of the color video signal so that said single field, as repeatedly reproduced and selectively delayed in two successive field periods, can function as interlaced fields of a frame.

2. An apparatus according to claim 1, in which said subcarrier signal from said source has its phase inverted at each horizontal scanning period of the color video signal so that said processed field signal supplied to said means for selectively delaying is according to the NTSC standard.

3. An apparatus for processing a repeatedly reproduced single field of a color video signal which includes modulated luminance and chrominance components, comprising:

means for separating said modulated luminance and chrominance components;

means for demodulating the separated luminance and chrominance components;

means for obtaining first and second color difference signals from the demodulated chrominance component;

means for providing the demodulated chrominance component with a subcarrier signal having a phase shifted by 90 degrees at each field period of the color video signal and which includes a source for generating said subcarrier signal with a phase inverted at each horizontal scanning period of said color video signal, first and second quadrature two-phase modulators in which said first and second color difference signals respectively modulate said subcarrier signal, a first phase-shifter operative to 90 degree phaseshift said subcarrier signal from said source, a second phase-shifter operative to 180 degree phase-shift said subcarrier signal from said source, and switching means changed-over alternately between first and second states at each of said field periods, said switching means in said first state supplying said first and second quadrature two-phase modulators with said subcarrier signal from said source and with the 90 degree phase-shifted subcarrier signal from said first phase-shifter, respectively, and said switching means in said second state supplying said 90 degree phase-shifted subcarrier signal and said 180 degree phase-shifted subcarrier signal from said first and second phase-shifters, respectively, to said first and second quadrature two-phase modulators, respectively;

mixing means for combining the demodulated luminance component with outputs of said first and second quadrature two-phase modulators; and means for selectively delaying an output of said mixing means during alternate field periods of said color video signal for a delay time equal to one-half a horizontal scanning period of said color video signal so that said output of said mixing means, as selectively delayed in two successive field periods, functions as a frame signal having interlaced fields.

* * * * *